United States Patent
Cronin et al.

(10) Patent No.: US 9,571,903 B2
(45) Date of Patent: Feb. 14, 2017

(54) BALL TRACKER SNIPPETS

(71) Applicant: ProSports Technologies, LLC, Miami, FL (US)

(72) Inventors: John Cronin, Bonita Springs, FL (US); Nick Reasner, Miami, FL (US)

(73) Assignee: ProSports Technologies, LLC, Miami, FL (US)

( * ) Notice: Subject to any disclaimer, the term of this patent is extended or adjusted under 35 U.S.C. 154(b) by 0 days.

(21) Appl. No.: 14/798,346

(22) Filed: Jul. 13, 2015

(65) Prior Publication Data

US 2016/0014481 A1    Jan. 14, 2016

Related U.S. Application Data

(60) Provisional application No. 62/023,809, filed on Jul. 11, 2014, provisional application No. 62/029,646, filed on Jul. 28, 2014.

(51) Int. Cl.

| | |
|---|---|
| *H04N 7/18* | (2006.01) |
| *H04N 21/8549* | (2011.01) |
| *G11B 27/031* | (2006.01) |
| *H04N 21/472* | (2011.01) |
| *G11B 27/10* | (2006.01) |
| *G11B 27/32* | (2006.01) |

(52) U.S. Cl.
CPC ......... *H04N 21/8549* (2013.01); *G11B 27/031* (2013.01); *G11B 27/10* (2013.01); *G11B 27/102* (2013.01); *G11B 27/322* (2013.01); *H04N 21/47205* (2013.01); *H04N 21/47217* (2013.01)

(58) Field of Classification Search
None
See application file for complete search history.

(56) References Cited

U.S. PATENT DOCUMENTS

| | | |
|---|---|---|
| 6,080,063 A | 6/2000 | Khosla |
| 6,144,375 A | 11/2000 | Jain et al. |
| 6,204,813 B1 | 3/2001 | Wadell et al. |
| 6,952,558 B2 | 10/2005 | Hardacker |

(Continued)

FOREIGN PATENT DOCUMENTS

| | | |
|---|---|---|
| CN | 102843186 | 12/2012 |
| EP | 2 150 057 | 12/2013 |

(Continued)

OTHER PUBLICATIONS

U.S. Appl. No. 14/798,314, John E. Cronin, Ball Tracker Camera, filed Jul. 13, 2015.

(Continued)

*Primary Examiner* — James M Anderson, II
(74) *Attorney, Agent, or Firm* — Polsinelli LLP (57) ABSTRACT

Systems and methods for providing ball tracker snippets are provided. Data may be received over a wireless communication regarding movement of a ball within an event venue during an event. Such received data may be based on signals from an antenna coupled to the ball. A video of the event may be synchronized to the received data. A portion of the received data may be identified as meeting a threshold. A portion of the video may be determined to be associated with the identified portion of received data that meets the threshold. A video snippet may then be extracted for the determined portion.

17 Claims, 7 Drawing Sheets

---

Providing a sport event video/audio stream in timing sequence, a ball position data source also synch'd by timing sequence, an integrate software, a time & video & position database, a ball video software, and a referee software GUI    710

Synchronizing the ball position data with the video/audio stream using the integrate software    720

Calculating a "rate-of-change" of ball position by timing sequence in the integrate software    730

Loading the results of the integrate software to a time & video & position database    740

Allowing a user, using ball video software, using a user interface to jump to video sequences, based upon a 'rate-of-change' position    750

Allowing a referee, using referee software GUI, to see actual ball position for making game calls    760

(56) References Cited

U.S. PATENT DOCUMENTS

| | | |
|---|---|---|
| 7,079,176 B1 | 7/2006 | Freeman et al. |
| 7,091,863 B2 | 8/2006 | Ravet |
| 7,136,042 B2 | 11/2006 | Magendanz et al. |
| 7,383,229 B2 | 6/2008 | Jacoby |
| 7,583,901 B2 | 9/2009 | Nakagawa et al. |
| 7,620,426 B2 | 11/2009 | Ortiz et al. |
| 7,715,723 B2 | 5/2010 | Kagawa et al. |
| 7,721,339 B2 | 5/2010 | Madison et al. |
| 7,734,730 B2 | 6/2010 | McCanne |
| 7,743,070 B1 | 6/2010 | Blumberg |
| 7,849,160 B2 | 12/2010 | Hayward |
| 7,884,855 B2 | 2/2011 | Ortiz |
| 8,019,227 B2 | 9/2011 | Iizuka |
| 8,042,140 B2 | 10/2011 | Thomas et al. |
| 8,091,111 B2 | 1/2012 | Logan et al. |
| 8,237,787 B2 | 8/2012 | Hollinger |
| 8,279,051 B2 | 10/2012 | Khan |
| 8,333,321 B2 | 12/2012 | Gressel et al. |
| 8,391,773 B2 | 3/2013 | Arseneau et al. |
| 8,408,553 B2 | 4/2013 | Eskildsen |
| 8,482,612 B2 | 7/2013 | Tamir et al. |
| 8,526,931 B1 | 9/2013 | Fraley |
| 8,538,276 B2 | 9/2013 | Shimada et al. |
| 8,588,432 B1 | 11/2013 | Simon |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,622,832 B2 | 1/2014 | Marty et al. |
| 8,626,465 B2 | 1/2014 | Moore et al. |
| 8,630,216 B2 | 1/2014 | Deivasigamani et al. |
| 8,638,367 B1 | 1/2014 | Allen |
| 8,660,501 B2 | 2/2014 | Sanguinetti |
| 8,706,044 B2 | 4/2014 | Chang et al. |
| 8,724,723 B2 | 5/2014 | Panicker et al. |
| 8,736,681 B2 | 5/2014 | Matsuzawa |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,124,729 B2 | 9/2015 | Jung et al. |
| 2002/0132612 A1 | 9/2002 | Ishii |
| 2002/0156835 A1 | 10/2002 | Williams et al. |
| 2003/0023595 A1 | 1/2003 | Carbom et al. |
| 2004/0071209 A1 | 4/2004 | Burg et al. |
| 2004/0086257 A1 | 5/2004 | Werberig et al. |
| 2004/0171381 A1 | 9/2004 | Inselberg |
| 2005/0012023 A1 | 1/2005 | Vock et al. |
| 2005/0027608 A1 | 2/2005 | Wiesmuller et al. |
| 2005/0093976 A1 | 5/2005 | Valleriano et al. |
| 2005/0202905 A1 | 9/2005 | Chesser |
| 2005/0259618 A1 | 11/2005 | Ahya et al. |
| 2005/0273830 A1 | 12/2005 | Silver et al. |
| 2006/0067654 A1 | 3/2006 | Herberger et al. |
| 2007/0188611 A1 | 8/2007 | Carter |
| 2007/0188612 A1 | 8/2007 | Carter |
| 2007/0200929 A1* | 8/2007 | Conaway ............ A63B 71/0605 |
| | | 348/157 |
| 2008/0137507 A1 | 6/2008 | Sun et al. |
| 2008/0140233 A1 | 6/2008 | Seacat |
| 2008/0192116 A1 | 8/2008 | Tamir et al. |
| 2009/0061971 A1 | 3/2009 | Weitzner et al. |
| 2009/0082110 A1 | 3/2009 | Relyea et al. |
| 2009/0171571 A1 | 7/2009 | Son et al. |
| 2010/0026809 A1* | 2/2010 | Curry .................... H04N 5/222 |
| | | 348/157 |
| 2010/0043040 A1 | 2/2010 | Olsen |
| 2010/0245588 A1 | 9/2010 | Waehner et al. |
| 2010/0306064 A1 | 12/2010 | Inselburg |
| 2011/0014974 A1 | 1/2011 | Torf |
| 2011/0050904 A1 | 3/2011 | Anderson |
| 2011/0125809 A1 | 5/2011 | Woods et al. |
| 2011/0165946 A1 | 7/2011 | Pavlich et al. |
| 2011/0202945 A1 | 8/2011 | Pickelsimer et al. |
| 2011/0280540 A1 | 11/2011 | Woodman |
| 2011/0304737 A1 | 12/2011 | Evans et al. |
| 2012/0052949 A1 | 3/2012 | Weitzner et al. |
| 2012/0054178 A1 | 3/2012 | Tran et al. |
| 2012/0188345 A1 | 7/2012 | Salow |
| 2012/0229338 A2 | 9/2012 | Eidloth et al. |
| 2012/0296826 A1 | 11/2012 | Bergdale et al. |
| 2012/0317302 A1 | 12/2012 | Silvestri et al. |
| 2013/0126713 A1 | 5/2013 | Haas et al. |
| 2013/0141555 A1 | 6/2013 | Ganick et al. |
| 2013/0160051 A1 | 6/2013 | Armstrong et al. |
| 2013/0182117 A1 | 7/2013 | Arseneau et al. |
| 2013/0196788 A1 | 8/2013 | Shimizu et al. |
| 2013/0205341 A1 | 8/2013 | Jabara et al. |
| 2013/0268620 A1 | 10/2013 | Osminer |
| 2013/0279917 A1 | 10/2013 | Son et al. |
| 2013/0283305 A1 | 10/2013 | Hirsch et al. |
| 2013/0286212 A1 | 10/2013 | Sandler et al. |
| 2013/0300821 A1 | 11/2013 | Lankford et al. |
| 2013/0300832 A1* | 11/2013 | Hohteri ................ H04N 5/262 |
| | | 348/46 |
| 2013/0303192 A1 | 11/2013 | Louboutin et al. |
| 2013/0305297 A1 | 11/2013 | Jabara et al. |
| 2013/0317835 A1 | 11/2013 | Mathew |
| 2013/0328917 A1 | 12/2013 | Zambetti et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335520 A1 | 12/2013 | Campbell et al. |
| 2013/0336662 A1 | 12/2013 | Murayama et al. |
| 2013/0343762 A1 | 12/2013 | Murayama et al. |
| 2014/0031058 A1 | 1/2014 | Zhang et al. |
| 2014/0057658 A1 | 2/2014 | Murad et al. |
| 2014/0062773 A1 | 3/2014 | MacGougan |
| 2014/0063259 A1 | 3/2014 | Rhodes et al. |
| 2014/0065962 A1 | 3/2014 | Le |
| 2014/0071221 A1 | 3/2014 | Dave |
| 2014/0072270 A1 | 3/2014 | Goldberg et al. |
| 2014/0105084 A1 | 4/2014 | Chhabra |
| 2014/0111625 A1 | 4/2014 | Dawe et al. |
| 2014/0139380 A1 | 5/2014 | Ouyang |
| 2014/0141803 A1 | 5/2014 | Marti |
| 2014/0150042 A1 | 5/2014 | Pacor et al. |
| 2014/0161416 A1 | 6/2014 | Chou et al. |
| 2014/0162628 A1 | 6/2014 | Bevelacqua |
| 2014/0164520 A1 | 6/2014 | Fan |
| 2014/0164760 A1 | 6/2014 | Hybertson |
| 2014/0167794 A1 | 6/2014 | Nath |
| 2014/0168170 A1 | 6/2014 | Lazarescu |
| 2014/0171039 A1 | 6/2014 | Bjontegard |
| 2014/0171114 A1 | 6/2014 | Marti |
| 2014/0180820 A1 | 6/2014 | Louboutin |
| 2014/0191979 A1 | 7/2014 | Tsudik |
| 2014/0195675 A1 | 7/2014 | Silver et al. |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0349750 A1 | 11/2014 | Thompson et al. |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |

(56) References Cited

U.S. PATENT DOCUMENTS

| | | |
|---|---|---|
| 2014/0375217 A1 | 12/2014 | Feri et al. |
| 2015/0006648 A1 | 1/2015 | Cao |
| 2015/0011242 A1 | 1/2015 | Nagaraj |
| 2015/0026623 A1 | 1/2015 | Horne |
| 2015/0031397 A1 | 1/2015 | Jouaux |
| 2015/0058781 A1 | 2/2015 | Malik et al. |
| 2015/0131845 A1 | 5/2015 | Forouhar et al. |
| 2015/0189349 A1 | 7/2015 | Nelson |
| 2015/0326902 A1 | 11/2015 | Levakov et al. |
| 2016/0008662 A1 | 1/2016 | Cronin |
| 2016/0014435 A1 | 1/2016 | Cronin |
| 2016/0062722 A1 | 3/2016 | Cronin |
| 2016/0066159 A1 | 3/2016 | Cronin |

FOREIGN PATENT DOCUMENTS

| | | |
|---|---|---|
| WO | WO 01/41884 | 6/2001 |
| WO | WO 2004/071598 | 8/2004 |
| WO | WO 2007/035878 A2 | 3/2007 |
| WO | WO 2007/035878 A3 | 3/2007 |
| WO | WO 2009/104921 | 8/2009 |
| WO | WO 2011/137100 | 11/2011 |
| WO | WO 2013/121215 | 8/2013 |
| WO | WO 2016/007962 | 1/2016 |
| WO | WO 2016/007965 | 1/2016 |
| WO | WO 2016/007967 | 1/2016 |
| WO | WO 2016/033366 | 3/2016 |
| WO | WO 2016/036571 | 3/2016 |

OTHER PUBLICATIONS

PCT/US15/40215, Ball Tracker Camera, Jul. 13, 2015.
U.S. Appl. No. 14/798,271, John Cronin, Event-Based Content Collection for Network-Based Distribution, filed Jul. 13, 2015.
U.S. Appl. No. 14/798,286, John Cronin, Camera Feed Distribution From Event Venue Virtual Seat Cameras, filed Jul. 13, 2015.
PCT/US15/40207, Camera Feed Distribution From Event Venue Virtual Seat Cameras, Jul. 13, 2015.
U.S. Appl. No. 14/788,748, John Cronin, Sports Television Applications, filed Jun. 30, 2015.
PCT/US2015/40223, Ball Tracker Snippets, Jul. 13, 2015.
U.S. Appl. No. 14/798,294, John Cronin, Event Data Transmission to Eventgoer Devices, filed Jul. 13, 2015.
U.S. Appl. No. 14/798,296, John Cronin, Event and Fantasy League Data Transmission to Eventgoer Devices, filed Jul. 13, 2015.
U.S. Appl. No. 14/837,457, John E. Cronin, Multiple Display Controller System, filed Aug. 27, 2015.
PCT/US15/47148, Multiple Display Controller System, Aug. 27, 2015.
U.S. Appl. No. 14/838,767, John E. Cronin, Automated Clip Creation, filed Aug. 28, 2015.
U.S. Appl. No. 14/829,184, Maxx T. Garrison, Event Media, filed Aug. 18, 2015.
U.S. Appl. No. 14/838,129, John E. Cronin, Current Event and Outside Event Data Transmission to Eventgoer Devices, filed Aug. 27, 2015.
PCT/US15/47265, Current Event and Outside Event Data Transmission to Eventgoer Devices, Aug. 27, 2015.
"Anvato Announces New Cloud Solution for HD Live Streaming, Clip Editing, Social Sharing and Archival", Anvato KNOWS/Video, May 12, 2014.
"Aspera to Showcase Digital Media Workflow and Broadcast It Solutions At Broadcastasia 2013", Aspera News, Jun. 4, 2013.
Barney et al., Casey; "Visible Light Communication Systems", A Major Qualifying Project Report Submitted to the Faculty of the Worchester Polytechnic Institute, Mar. 28, 2014.
"Bright Leverages Cloud to Stream Sports Content Worldwide", by Sports Video Group, Jul. 9, 2013.
"Casio Unveils Prototype of Visible Light Communication System Using Smartphones at CES", Casio Computer Co., Ltd., Jan. 10, 2012.
"Camera Corps Robotic Cameras Systems to Televise Wimbledon Action", TVTechnology, Jun. 24, 2013. http://www.tvtechnology.com/equipment/0082/camera-corps-ro . . . .
"Cisco Stadium Vision Mobile", Cisco, May 21, 2014.
Coxworth, Ben; "NFL may track footballs using magnetic fields", Gizmag.com, Jun. 13, 2014 http://www.gizmag.com/football-tracking-magnetic-fields/3254 . . . .
"Create Innovative SERVICES with PLAY APPs", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Davies, Chris; "Philips LED lights flicker out a challenge to iBeacon and Gimbal", SlashGear, Feb. 17, 2014.
Dawson, Keith; "LiFi in the Real World" All LED Lighting—Illuminating the Led Community, Jul. 31, 2013.
Dinh et al., Thang; "Real time tracking using an active pan-tilt-zoom network camera", Proceeding IROS '09 Proceedings of the 2009 IEEE/RSJ International conference on Intelligent robots and systems. pp. 3786-3793, 2009.
"Engaged Sports Media Selects thePlatform as Centralized Cloud-based Video Publishing System", thePlatform, Oct. 31, 2013.
"EZ Display and EZ Remote for Android—User Guide", InFocus, Jul. 10, 2013.
Fisher et al., Brian E.; "Measurements corner: Three-dimensional position and orientation measurements using magneto-quasistatic fields and complex image theory", IEEE Xplore Abstract, Antennas and Propagation Magazines, IEEE (vol. 56, Iss. 1) Feb. 2014, pp. 160-173.
"Football camera provides ball's-eye view of the field", R&D Magazine Webcast, Feb. 27, 2013.
Gaddam et al., Vamsidhar R.; "Interactive Zoom and Panning from Live Panoramic Video", Nossdav '14 Proceedings of Network and Operating Systems Support for Digital Audio and Video Workshop, Mar. 19, 2014.
Gerhardt, Ryan; "Stadium App Lets Fans Order Food and Get On-Court Close Ups", PSFK.com, Feb. 22, 2013.
"GigaBroadcasting", Li-Fi Consortium, Date of Download: Aug. 14, 2014.
Gilpin, Lyndsey; "How GE created smart lights by integrating beacons into LEDs", TechRepublic, Jun. 6, 2014.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
Hammond, Teena; "Stadiums race to digitize: How sports teams are scrambling to keep Millenials coming to games", TechRepublic. Apr. 12, 2014.
"Hybrid's Sport Track Enables Robotic Cameras to Follow Action", TVTechnology, May 29, 2013 http://www.tvtechnology.com/news/0086/hybrids-sport-track-en.
Jaffe, Jay; "MLB unveils revolutionary next-level tracking technology on defense", The Strike Zone, Mar. 3, 2014.
Kamenetzky, Andy; "Inside the Most Connected Sports Venue in America (And, No, It Ain't Cowboys Stadium)", Digital Trends, Nov. 6, 2013.
Kaplan, Daniel; "In-game locker room video still rare around NFL", SportsBusiness Journal, Sep. 30, 2013.
Kappeler et al., Uwe-Philipp; "3D Object Localizationi via Stereo Vision using an Omnidirectional and a Perspective Camera", Proceedings of the 2nd. Workshop on Omnidirectional Robot Vision. May 7, 2010. ISBN 978-88-95872-02-5 pp. 7-12.
Keith Price Bibliography Sports, Line Judge, Ball Position, Ball Tracking and Enhanced Displays, VisionBib. Date of download: Apr. 24, 2014 http://www.visionbib.com/bibliography/motion-f746ba1.html.

(56) References Cited

OTHER PUBLICATIONS

Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
Lavars, Nick; "Adidas miCoach Smart Ball tracks your striking power and finesse", Gizmag.com, May 28, 2014 http://www.gizmag.com/adidas-micoach-smart-soccer-ball/3228 . . . .
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
"Manchester City's Etihad Stadium is soon to be transformed into the Premier League's most technologically fan-friendly stadium", Machester City, May 8, 2013.
Montero, Eric, "Design and Implementation of Color-Shift Keying for Visible Light Communications", Sep. 2013, McMaster University.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consortium (VLCC), Apr. 26, 2012.
Pawate et al., Raj; "Remote display technology enhances the cloud's user experience", Texas Instruments, Aug. 2012.
Pingali et al., Gopal' "Lucentivision: Converting Real World Events Into Multimedia Experiences", Multimedia and Expo, 2000. ICME 2000. 2000 IEEE International Conference on vol. 3, Jul. 30, 2000-Aug. 2, 2000.
Povey, Gordon, "VLC for Location, positioning and navigation", Jul. 27, 2011, http://visiblelightcomm.com/vlc-for-location-positioning-and-n . . . .
"Proprietary Data Is Foundational", Contextual Database| Delivery Agent, Inc. Date of Download: Apr. 30, 2014 http://www.deliveryagent.com/products/contextual-database/.
RedFIR Precision Real-Time Tracking, Fraunhofer Institute for Integrated Circuits IIS. Oct. 7, 2015.
Ren et al., Jinchang; "A General Framework for 3D Soccer Ball Estimation and Tracking", Image Processing, 2004. ICIP '04. 2004 International Conference on (vol. 3) Date of Conference: Oct. 24-27, 2004.
Rufo et al., J.; "Visible Light Communication Systems for Optical Video Transmission", Microwave and Optical Technology Letters, vol. 52, No. 7, Jul. 2010.
"Streaming Video Online Databases", MLibrary, University of Michigan. Maintained by: Clara Slavens, last modified: Apr. 17, 2014.
"Surveillance Monitoring—Networking Security—PTZ Network Cameras", Panasonic USA. http://www.panasonic.com/business/psna/products-surveillance-monitoring/network-security-cameras/ptz-cameras.aspx Date of Download: Apr. 29, 2014.
Swedberg, Claire; "RFID Helps Soccer Teams Keep Their Eye on the Ball, and Their Players", RFID Journal, Mar. 13, 2012.
Thanigavel, M.; "Li-Fi Technology in Wireless Communication", International Journal of Engineering Research & Technology (IJERT), ISSN: 2278-0181, vol. 2 Issue 10, Oct. 2013.

Wells, Alton; "How would you build a gimball system that could track any point within a 360 degree "sphere"", AskEngineers. Posted on Aug. 26, 2013.
Wiedeman, Reeves; "Sporting Kansas City Makes the Stadium More Like Your Couch", BloombergBusinessweek, Jul. 18, 2013.
Woodward, Alexander; Delmas, Patrice; "Computer Vision for Low Cost 3-D Golf Ball and Club Tracking", CITR, University of Auckland, Dept. Computer Science, New Zealand.Date of Download: Apr. 29, 2014.
Won, Eun Tae; "Visible Light Communication: Tutorial", Project: IEEE P802.15 Working Group for Wireless Personal Area Networks (WPANs), Mar. 9, 2008.
"World Cup 2014: Goalline technology TV process reviewed", BBC Sport, Jun. 16, 2014. http://www.bbc.com/sport/0/football/27864393.
Yan, Fei; "Tennis Ball Tracking for Automatic Annotation of Broadcast Tennis Video", Centre for Vision, Speech and Signal Processing, School of Electronics and Physical Sciences, Jun. 2007.
Yu, Shuang; "Automatic Basketball Tracking in Broadcast Basketball Video", A Thesis submitted in partial fulfillment of the requirements for the Degree of Master of Science in the Faculty of Graduate Studies. Aug. 2012.
PCT Application No. PCT/US2015/033613 International Search Report and Written Opinion mailed Sep. 1, 2015.
PCT Application No. PCT/US2015/040207 International Search Report and Written Opinion mailed Oct. 5, 2015.
PCT Application No. PCT/US2015/040215 International Search Report and Written Opinion mailed Sep. 29, 2015.
PCT Application No. PCT/US2015/040223 International Search Report and Written Opinion mailed Oct. 1, 2015.
U.S. Appl. No. 14/798,271 Office Action mailed Nov. 2, 2015.
U.S. Appl. No. 14/788,748 Office Action mailed Nov. 5, 2015.
U.S. Appl. No. 14/798,294 Office Action mailed Nov. 2, 2015.
U.S. Appl. No. 14/838,129 Office Action mailed Oct. 29, 2015.
PCT Application No. PCT/US2015/047148 International Search Report and Written Opinion mailed Dec. 17, 2015.
U.S. Appl. No. 14/798,271 Final Office Action mailed May 5, 2016.
U.S. Appl. No. 14/798,296 Office Action mailed Apr. 5, 2016.
U.S. Appl. No. 14/837,457 Office Action mailed Feb. 6, 2016.
U.S. Appl. No. 14/838,767 Office Action mailed Feb. 16, 2016.
U.S. Appl. No. 14/829,184 Final Office Action mailed Mar. 21, 2016.
PCT Application No. PCT/US2015/047265 International Search Report and Written Opinion mailed Dec. 7, 2015.
U.S. Appl. No. 14/798,286 Office Action mailed Dec. 4, 2015.
U.S. Appl. No. 14/829,184 Office Action mailed Nov. 23, 2015.
U.S. Appl. No. 14/798,296 Final Office Action mailed Sep. 13, 2016.
U.S. Appl. No. 14/837,457 Final Office Action mailed Aug. 23, 2016.
U.S. Appl. No. 14/838,767 Final Office Action mailed Aug. 25, 2016.
U.S. Appl. No. 14/829,184 Office Action mailed Sep. 12, 2016.
U.S. Appl. No. 14/798,294 Office Action mailed Oct. 4, 2016.
U.S. Appl. No. 14/798,286 Final Office Action mailed Jun. 8, 2016.
U.S. Appl. No. 14/788,748 Final Office Action mailed May 26, 2016.
U.S. Appl. No. 14/798,294 Final Office Action mailed May 13, 2016.
U.S. Appl. No. 14/838,129 Final Office Action mailed Jun. 10, 2016.

\* cited by examiner

BALL TRACKER SNIPPETS

CROSS-REFERENCE TO RELATED APPLICATIONS

The present patent application claims the priority benefit of U.S. provisional patent application No. 62/023,809 filed Jul. 11, 2014 and titled "Ball Tracker Snippets for Coaching and Training and Broadcasting for Instant Highlights," and U.S. provisional patent application No. 62/029,646 filed Jul. 28, 2014 and titled "Ball Tracker Snippets for coaching, Training, and Broadcasting for Making Calls," the disclosures of which are incorporated by reference herein.

BACKGROUND OF THE INVENTION

1. Field of the Invention

The present invention generally relates to video snippets. More specifically, the present invention relates to ball tracker snippets.

2. Description of the Related Art

Many events may be filmed for live (e.g., real-time) or recorded broadcast. Such events may include a variety of athletic and sporting events involving such equipment as balls, bats, pucks, etc. As the outcome of such athletic and sporting events depends on actions involving such equipment (e.g., a football), a camera (or multiple cameras) may often follow the ball as it is moving during the course of the event. Each such camera is generally controlled by a cameraperson who adjusts the focus and position of the camera as necessary to follow a moving ball.

There may be instances where a cameraperson may lose track of the ball (or other type of equipment). For example, the game may be moving very quickly, or the athletes may be executing a play that involves misdirection. In such instances, the camera may be unable to capture the current state of the ball, resulting in gaps in the action of the event. Audiences—both those viewing remotely and those present in-person, but may be relying on the camera for close-ups—may then become unhappy or dissatisfied as a result of being unable to view the entirety of the event.

Other parties (e.g., coaching and training staff, referees) may also have an interest in following the play of the ball accurately. Coaches and trainers, for example, may wish to use video to evaluate plays to determine how well a player or team is playing and to improve play, as needed. Referees may also wish to use video so as to be able to make accurate decisions regarding officiating, as well as to improve their own skills, as needed. Such parties therefore have an interest in obtaining video snippets of relevant plays (from among a plurality of plays that may occur during any particular event) for analytical purposes.

There is, therefore, a need in the art for improved systems and methods for improved system and methods of providing ball tracker snippets.

SUMMARY OF THE CLAIMED INVENTION

Embodiments of the present invention include systems and methods for providing ball tracker snippets. Data may be received over a wireless communication regarding movement of a ball within an event venue during an event. Such received data may be based on signals from an antenna coupled to the ball. A video of the event may be synchronized to the received data. A portion of the received data may be identified as meeting a threshold. A portion of the video may be determined to be associated with the identified portion of received data that meets the threshold. A video snippet may then be extracted for the determined portion.

Various embodiments may include systems for providing ball tracker snippets. Such systems may include a communication interface that receives data over a wireless communication regarding movement of a ball within an event venue during an event where the received data is based on signals from an antenna coupled to the ball and a processor that executes instructions to synchronize a video of the event to the received data, identify that a portion of the received data meets a threshold, determine which portion of the video is associated with the identified portion of received data that meets the threshold, and extract a video snippet for the determined portion.

Additional embodiments may include methods for providing ball tracker snippets. Such methods may include receiving data over a wireless communication regarding movement of a ball within an event venue during an event where the received data is based on signals from an antenna coupled to the ball, synchronizing a video of the event to the received data, identifying that a portion of the received data meets a threshold, determining which portion of the video is associated with the identified portion of received data that meets the threshold, and extracting a video snippet for the determined portion.

Yet further embodiments may include non-transitory computer-readable storage media that embody programmable instructions for performing methods of providing ball tracker snippets as described herein.

DETAILED DESCRIPTION

Embodiments of the present invention include systems and methods for providing ball tracker snippets. Data may be received over a wireless communication regarding movement of a ball within an event venue during an event. Such received data may be based on signals from an antenna coupled to the ball. A video of the event may be synchronized to the received data. A portion of the received data may be identified as meeting a threshold. A portion of the video may be determined to be associated with the identified portion of received data that meets the threshold. A video snippet may then be extracted for the determined portion.

Figure 1:
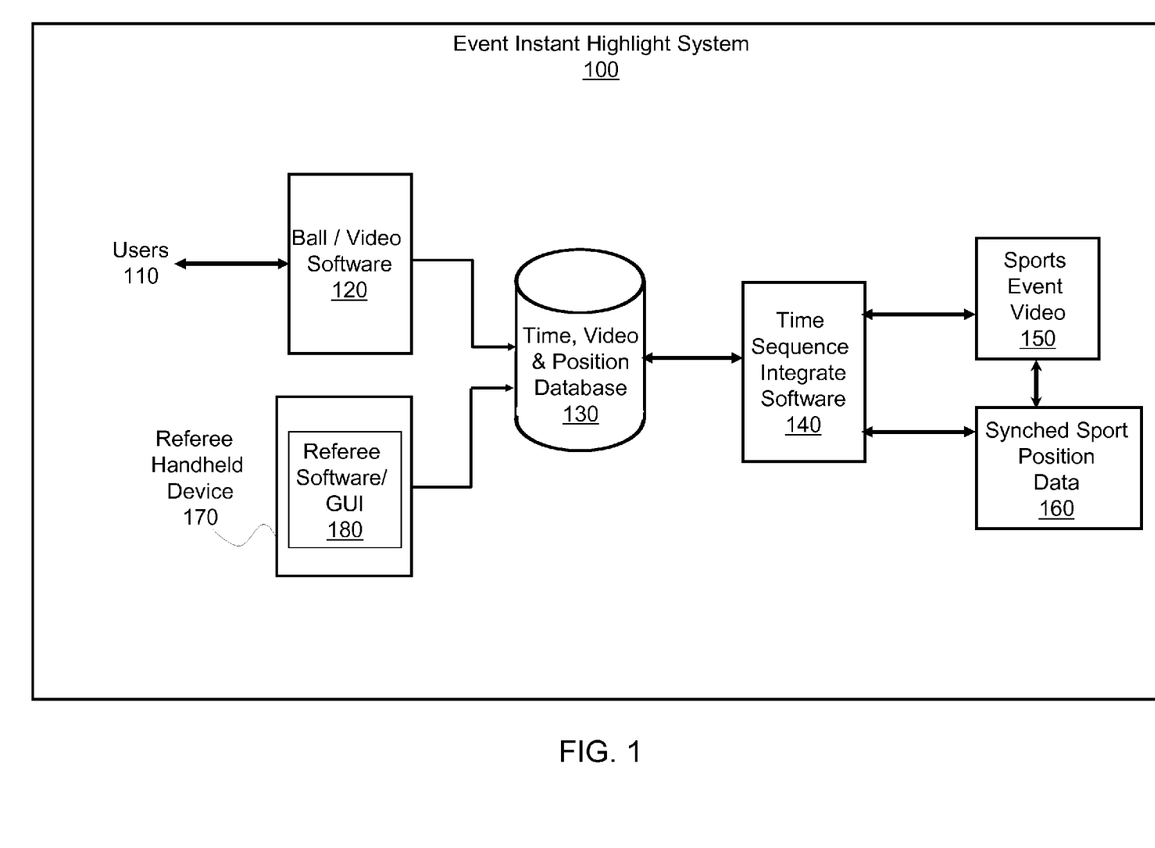
FIG. 1 illustrates an exemplary environment in which a system for providing ball tracker snippets may be implemented.

FIG. 1 illustrates an exemplary environment in which a system for providing ball tracker snippets may be implemented. Event instant highlight system 100 may include user devices 110, ball/video software 120, time/video/position database 130, time sequence integrate software 140, sports event video 150, synched sport position data 160, and referee handheld device 170 (with referee software/GUI 180).

Users (e.g., coaches, trainers, broadcasters) may use any number of different electronic user devices 110 to interact with the rest of the system. Such user devices 110 may include general purpose computers, mobile phones, smartphones, personal digital assistants (PDAs), portable computing devices (e.g., laptop, netbook, tablets), desktop computing devices, handheld computing device, or any other type of computing device capable of communicating over a communication network. User devices 110 may also be configured to access data from other storage media, such as memory cards or disk drives as may be appropriate in the case of downloaded services. User device 110 may include standard hardware computing components such as network and media interfaces, non-transitory computer-readable storage (memory), and processors for executing instructions that may be stored in memory.

Ball/video software 120 may be used by various user devices 110 to retrieve data from time/video/position database 130, which may be maintained via time sequence integrate software 140 that receives incoming sports event video 150 and synchronizes such video to sport position data 160 coming from the ball itself (specifically an antenna coupled to the ball) or from another piece of sports equipment with coupled antenna. Such position data taken throughout the duration of the event may then be synchronized to corresponding video of the event.

Referees in particular may have a handheld device 170 used to interact with the synchronized data. Such handheld device 170 may be similar to user device 110, but specifically provide referee-specific software and GUI 180.

Figure 2:
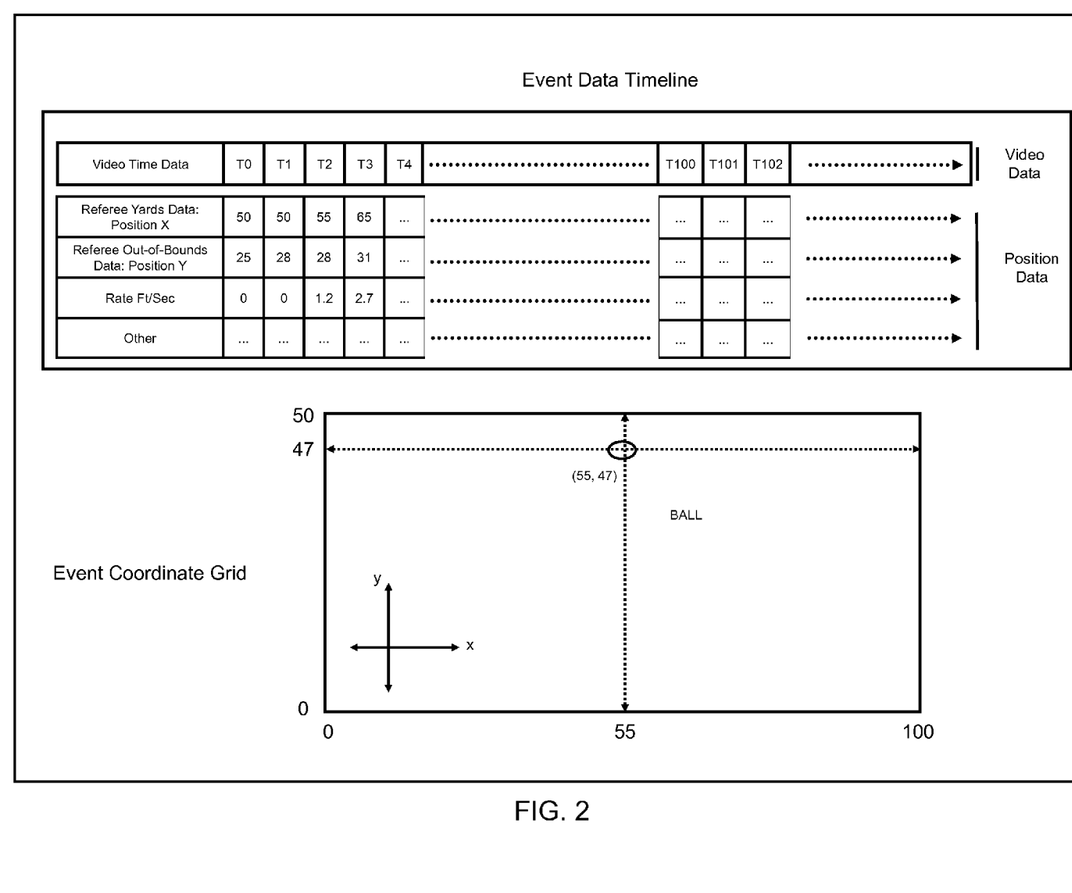
FIG. 2 illustrates an exemplary event data timeline and event coordinate grid that may be used in a system for providing ball tracker snippets.

FIG. 2 illustrates an exemplary event data timeline 210 and event coordinate grid 220 that may be used in a system for providing ball tracker snippets. Event data timeline 210 may include representation of the video of each of the frames (e.g., T0, T1, T2, etc.) for the video data. For each video snippet (e.g., any combination of consecutive frames between T0 and T102), there may be associated data recording the actual XY position of the ball. For example, the event data timeline 210 shows the game starting with the ball at fifty-yard line and twenty-five feet from the sidelines, and then moving to different XY positions in each frame. In addition, the rate of the ball at different points of the game as captured in each frame may be provided. For example, the ball starts off still, but accelerates to 1.2 feet per second by frame T2. Event coordinate grid 220 is a visual representation of the XY grid laid out over the event venue.

Figure 3:
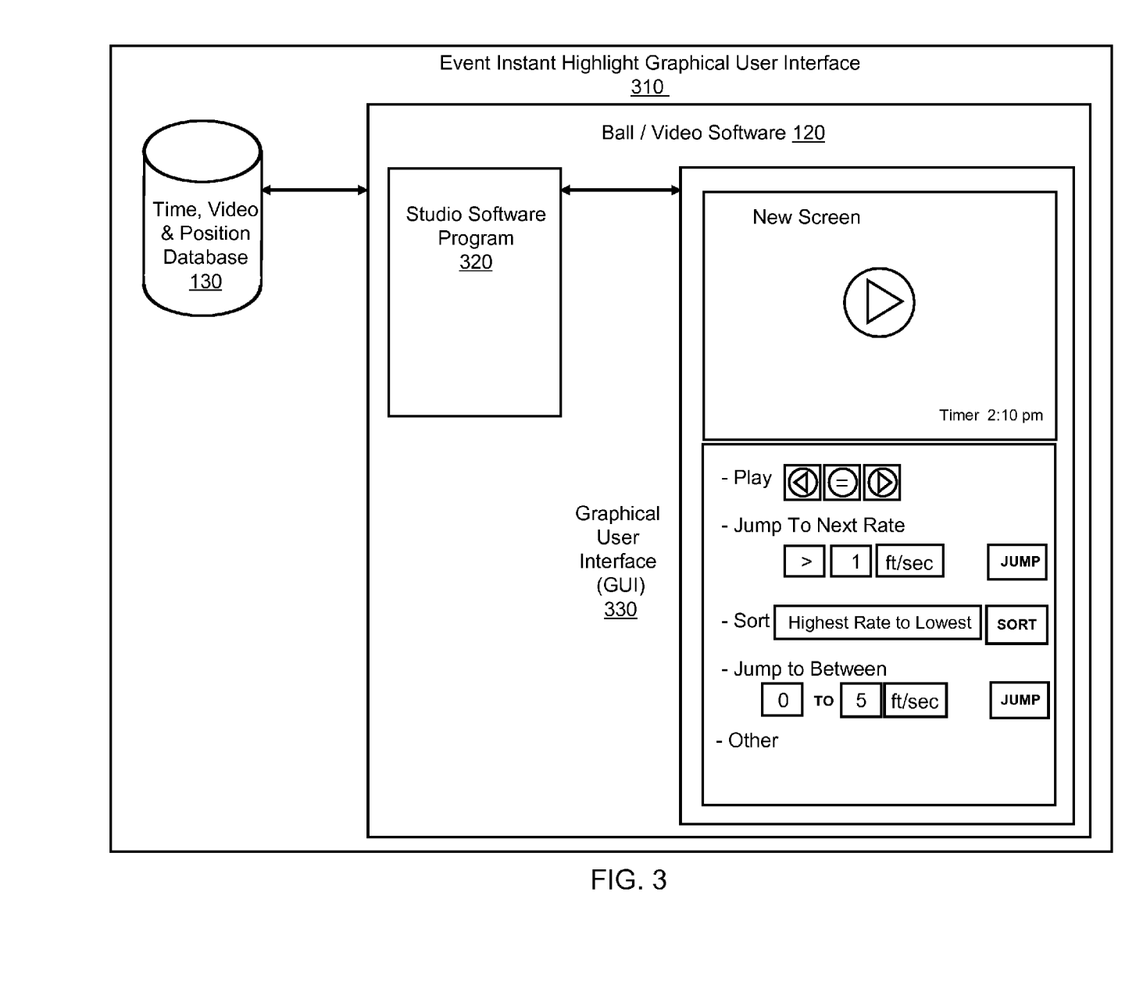
FIG. 3 illustrates an exemplary event instant highlight graphical user interface (GUI).

FIG. 3 illustrates an exemplary event instant highlight graphical user interface (GUI) 310. Such an event instant highlight GUI 310 may rely on ball/video software 120 communicating with time/video/position database 130. Ball/video software 120 may include studio software program 320, as well as the actual graphical user interface (GUI) 330. As noted above, the ball position data may be synchronized to video. The studio software 320 may access such data from time/video/position database 130 and provide to GUI 330 for display to a user (e.g., broadcaster or other media service provider). The GUI 330 allows for the user to play, rewind, fast-forward, pause, etc. In addition, GUI 330 may allow the user to skip to different frames where the rate changes, sort by rates (e.g., highest to lowest), or to the video portion(s) where the ball is moving at a specified rates or located at specified XY position (e.g., at the fifteen yard line).

Figure 4:
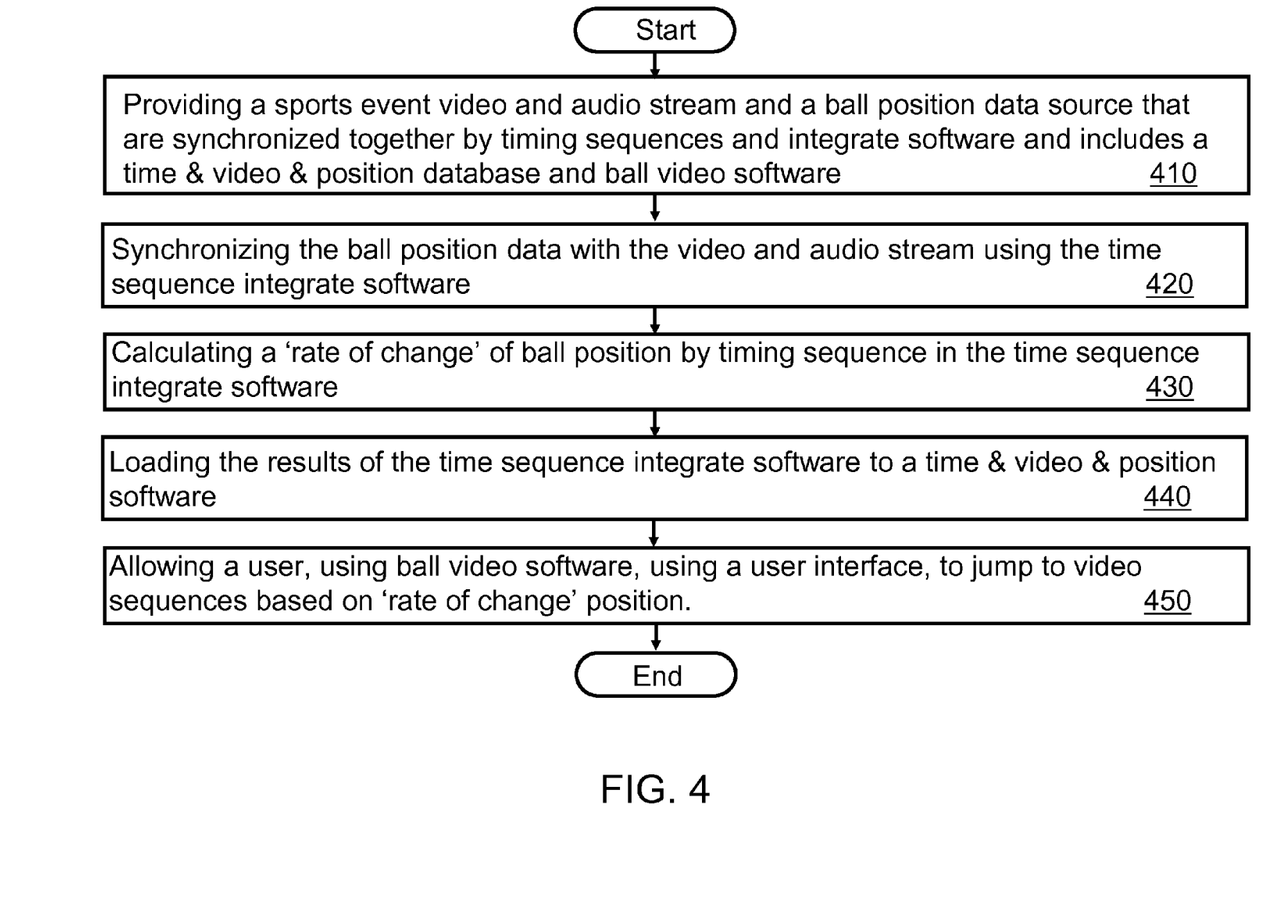
FIG. 4 is a flowchart illustrating an exemplary method for providing ball tracker snippets for broadcast.

FIG. 4 is a flowchart illustrating an exemplary method for providing ball tracker snippets for broadcast. The method of FIG. 4 (and other methods discussed herein) may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in the method of FIG. 4 (and other methods discussed herein), as well as the order thereof, are exemplary and may include various alternatives, equivalents, or derivations thereof including but not limited to the order of execution of the same.

In steps 410 and 420, a sports event video 150 (including audio stream) may be provided and synchronized with sport position data 160 (e.g., using ball/video software 120, time/video/position database 130, and time sequence integrate software 140). In step 430, a rate of change may be calculated for the ball position (e.g., by time sequence integrate software 140). In step 440, the results of the time sequence integrate software 140 may be loaded to time/video/position database 130. In step 450, a user may use GUI 330 to find, skip to, or extract portions of video based on the rate of change calculated in step 430.

Figure 5:
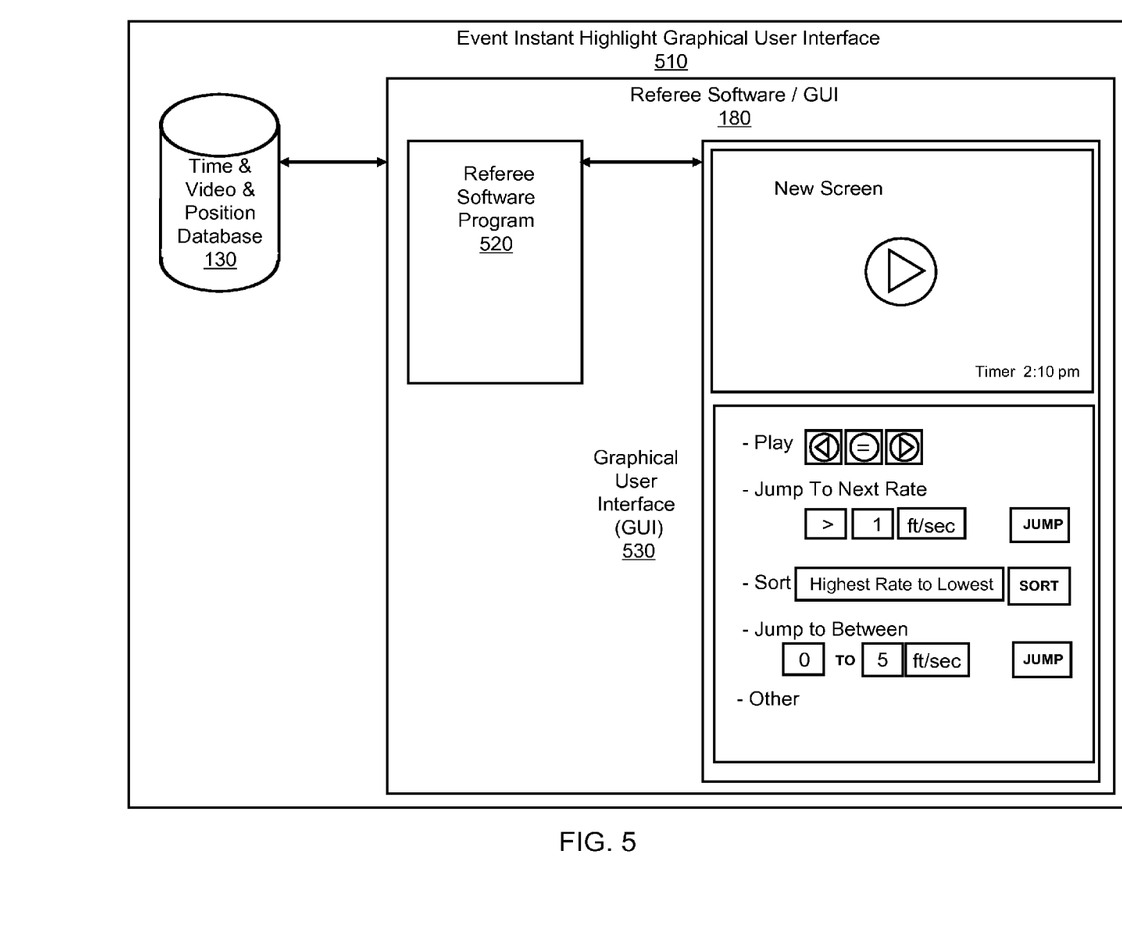
FIG. 5 illustrates an exemplary event instant highlight graphical user interface (GUI) for referees.

FIG. 5 illustrates an exemplary event instant highlight graphical user interface (GUI) for referees. Such event instant highlight GUI for referees 510 is very similar to the GUI 310 described with respect to event instant highlight 310 of FIG. 3. Because the event instant highlight GUI for referees 510 is specific to referees, however, a referee software program 520 and referee-specific GUI 530 may be provided. While similar options may be provided for play, rewind, fast-forward, pause, jump (or skip to), sort, etc., additional referee-specific options may also be provided, as described further with respect to FIG. 6.

Figure 6:
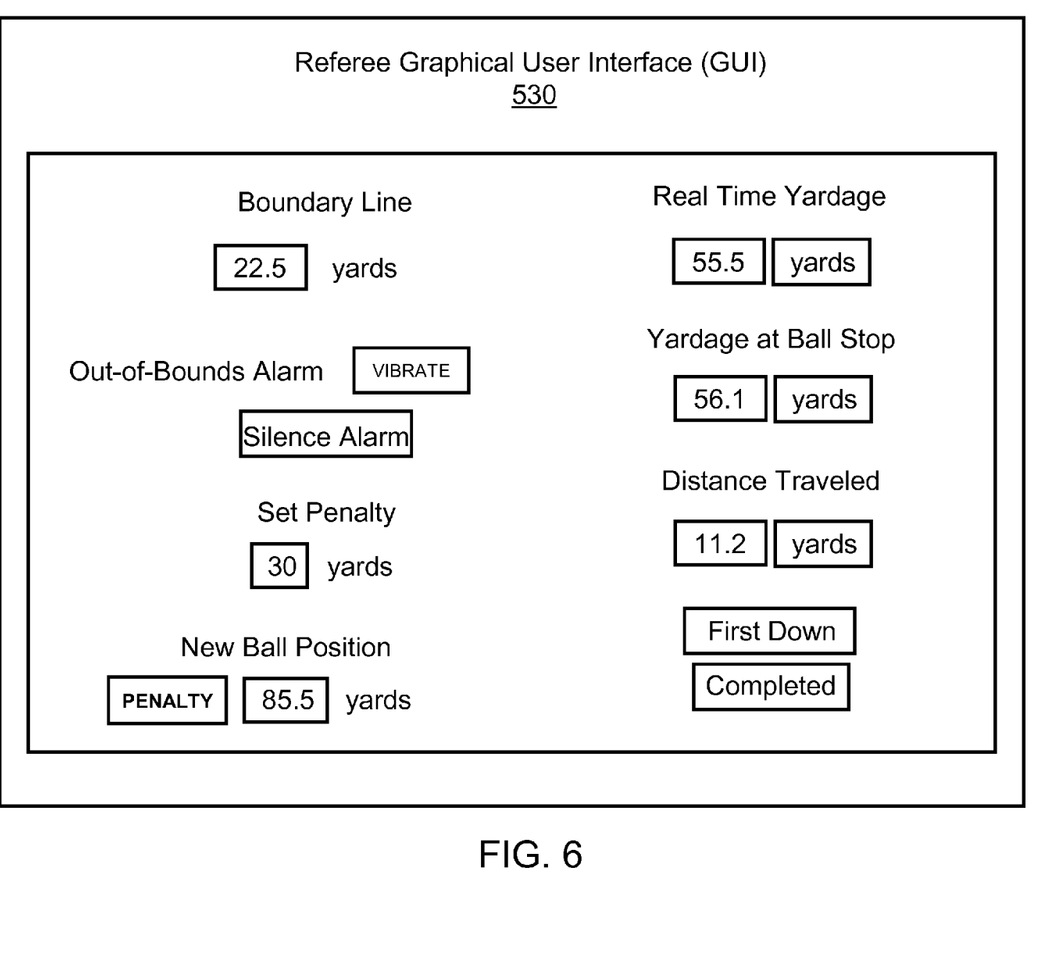
FIG. 6 illustrates an exemplary referee GUI that may be used in a system for providing ball tracker snippets.

FIG. 6 illustrates an exemplary referee GUI 530 that may be used in a system for providing ball tracker snippets. As illustrated, referee GUI 530 may provide such data as may be useful to referees making officiating decisions that are based on ball position. Such data may include information regarding boundary line, out-of-bounds alarms, set penalty, new ball position, real-time yardage, yardage at ball stop, distance traveled, and whether a first down was completed.

As the ball is moved (e.g., carried by player, kicked, or thrown), the referee is provided with the real-time yardage of the ball (e.g., 55.5 yards), as well as the yardage when the ball is stopped (e.g., 56.1 yards). The referee may also be provided with data indicating that a first down has occurred (e.g., ball has traveled 11.2 yards). So once he marks where the first down is to go, there are now 11.2 yards to the first down. When such a first down has been noted, an alarm may be initiated (e.g., lights up or flashes) to notify the referee that the first down is completed. The referee may then clear the notification, which resets the counter for the next first down.

Further, the boundary line shows that the ball is in 22.5 yards on the Y axis, such that the ball remains in bounds. An alarm may be set so that if the ball goes out of minus 0 or plus 50, the alarm may buzz and ring and vibrate, at which point the referee may silence the alarm. The referee may also set a penalty, at which point the referee GUI 530 may also automatically update the new ball position. Such data regarding yardage may come from time/video/position database 130 (which may include data regarding out-of-bounds positions).

Figure 7:
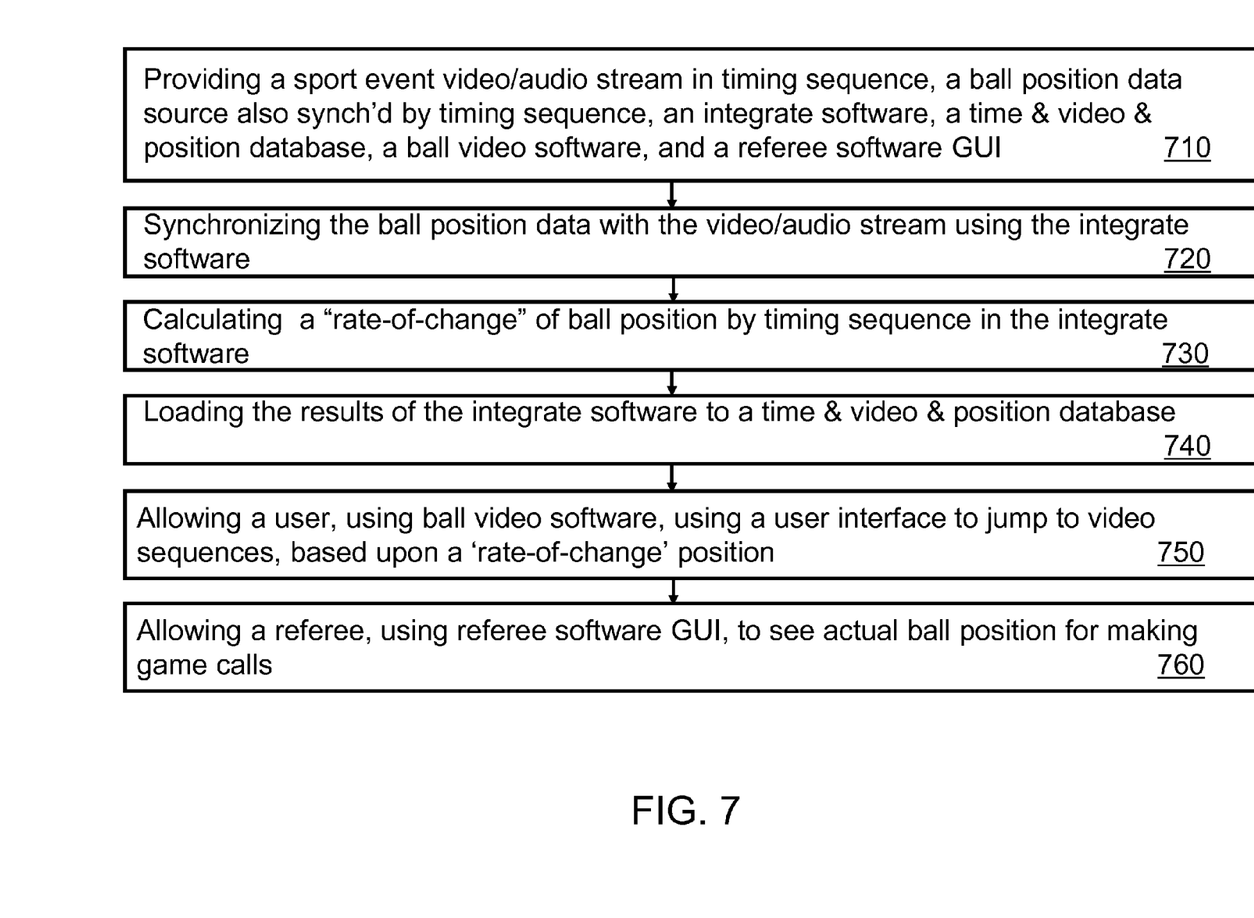
FIG. 7 is a flowchart illustrating an exemplary method for providing ball tracker snippets for referees.

FIG. 7 is a flowchart illustrating an exemplary method for providing ball tracker snippets for referees. Steps 710 and 720 are similar to steps 410 and 420, respectively, in allowing for a sports event video 150 (including audio stream) to be provided and synchronized with sport position data 160 (e.g., using ball/video software 120, time/video/position database 130, and time sequence integrate software 140). Likewise, steps 730, 740, and 750 are similar respectively to steps 430, 440, and 450 in providing for calculation of a rate of change by time sequence integrate software 140, loading of results of the time sequence integrate software 140 to time/video/position database 130, and allowing a user may use GUI 530 to find, skip to, or extract portions of video based on the rate of change calculated in step 730. Step 760 is specific to referees, however, allowing the referee access to specific types of data relevant to game officiating and game calls.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A system for ball tracker video, the system comprising:
a memory that stores a specified threshold rate value;
a communication interference that receives ball data via one or more wireless signals from an antenna coupled to a ball, the received ball data including timeline data associated with a timeline of an event and position data associated with positions of the ball within an event venue during the event; and
a processor that executes instructions stored in the memory, wherein execution of the instructions by the processor:
synchronizes video data of at least a subset of the event to the timeline data,
identifies a plurality of time durations along the timeline based on the received ball data, wherein each time duration corresponds to a rate traveled by the ball during the respective time duration, wherein each rate meets or exceeds the specified threshold rate value,
sorts the plurality of rates from a highest rate to a lowest rate, wherein the plurality of time durations are sorted according to the sorting of the plurality of rates,
identifies a plurality of portions of the video data that are synchronized with the plurality of time durations, and
extracts a video snippet from the video data, the video snippet including a first video portion of the plurality of video portions.

2. The system of claim 1, further comprising a display screen that displays the video snippet.

3. The system of claim 1, further comprising a user interface that receives the specified threshold rate value.

4. The system of claim 1, wherein execution of the instructions by the processor further synchronizes the timeline data with the position data.

5. The system of claim 1, wherein execution of the instructions by the processor further identifies, based on the position data and the timeline data, a plurality of ball travel distances corresponding to the plurality of time durations.

6. The system of claim 1, wherein execution of the instructions by the processor further generates an event coordinate grid that maps coordinates to the event venue.

7. The system of claim 1, further comprising a database in the memory, wherein the database that stores the plurality of portions of the video data.

8. The system of claim 1, wherein the video snippet corresponds to the highest rate of the plurality of rates.

9. A method for ball tracker video, the method comprising:
storing a specified threshold rate value in a memory;
receiving ball data via one or more wireless signals from an antenna coupled to a ball, the received ball data including timeline data associated with a timeline of an event and position data associated with positions of the ball within an event venue during the event; and
executing instructions stored in memory, wherein execution of the instructions by the processor:
synchronizes video data of at least a subset of the event to the timeline data,
identifies a plurality of time durations along the timeline based on the received ball data, wherein each time duration corresponds to a rate traveled by the ball during the respective time duration, wherein each rate meets or exceeds the specified threshold rate value,
sorts the plurality of rates from a highest rate to a lowest rate, wherein the plurality of time durations are sorted according to the sorting of the plurality of rates,
identifies a plurality of portions of the video data that are synchronized with the plurality of time durations, and
extracts a video snippet from the video data, the video snippet including a first video portion of the plurality of video portions.

10. The method of claim 9, further comprising displaying on a display screen the video snippet.

11. The method of claim 9, further comprising receiving the specified threshold rate value via a user interface.

12. The method of claim 9, further comprising synchronizing the timeline data with the position data.

13. The method of claim 9, further comprising identifying, based on the position data and the timeline data, a plurality of ball travel distances corresponding to the plurality of time durations.

14. The method of claim 9, further comprising generating an event coordinate grid that maps coordinates to the event venue.

15. The method of claim 9, further comprising storing the plurality of portions of the video data in a database in the memory.

16. The method of claim 9, wherein the video snippet corresponds to the highest rate of the plurality of rates.

17. A non-transitory computer-readable storage medium, having embodied thereon a program executable by a processor to perform a method for ball tracker video, the method comprising:

storing a specified threshold rate value in a memory;

receiving ball data via one or more wireless signals from an antenna coupled to a ball, the received ball data including timeline data associated with a timeline of an event and position data associated with positions of the ball within an event venue during the event; and     synchronizing video data of at least a subset of the event to the timeline data,     identifying a plurality of time durations along the timeline based on the received ball data, wherein each time duration corresponds to a rate traveled by the ball during the respective time duration, wherein each rate meets or exceeds the specified threshold rate value,     sorting the plurality of rates from a highest rate to a lowest rate, wherein the plurality of time durations are sorted according to the sorting of the plurality of rates,     identifying a plurality of portions of the video data that are synchronized with the plurality of time durations, and     extracting a video snippet from the video data, the video snippet including a first video portion of the plurality of video portions.

\* \* \* \* \*